United States Patent [19]
Dedolph

[11] 3,882,634
[45] May 13, 1975

[54] ROTARY PLANT GROWTH ACCELERATING APPARATUS

[75] Inventor: Richard D. Dedolph, Northfield, Ill.

[73] Assignee: The United States of America as represented by the National Aeronautics and Space Administration, Washington, D.C.

[22] Filed: Dec. 27, 1973

[21] Appl. No.: 428,995

[52] U.S. Cl. ............................. 47/1.2; 47/39; 47/58
[51] Int. Cl. ............................................. A01g 31/00
[58] Field of Search ...................... 47/58, 1.2, 17, 39

[56] References Cited
UNITED STATES PATENTS

| | | | |
|---|---|---|---|
| 3,254,447 | 6/1966 | Ruthner | 47/1.2 |
| 3,339,308 | 9/1967 | Clare | 47/1.2 |
| 3,343,300 | 9/1967 | Englert | 47/17 |
| 3,380,190 | 4/1968 | Granger | 47/58 |
| 3,529,379 | 9/1970 | Ware | 47/17 |

OTHER PUBLICATIONS

Gravity and Plant Development, Gordon, Proc. of 24th Biology Colloquium, OSU 1963, Oregon State Univ. Press.

The Physical Basis—, Dedolph et al., Plant Physiology, 1971, Vol. 47, pp. 756–764.

Aspects on Gravity—, Johnsson, Quarterly Rev. of Bio-physics, 1971, (4), pp. 277–320.

*Primary Examiner*—Robert E. Bagwill
*Attorney, Agent, or Firm*—Darrell G. Brekke; Armand G. Morin, Sr.; John R. Manning

[57] ABSTRACT

Rotary plant growth accelerating apparatus for increasing plant yields by effectively removing the growing plants from the constraints of gravity and increasing the plant yield per unit of space, and including a plurality of cylindrical plant beds supported radially removed from a primary axis of rotation, with each plant bed being driven about its own secondary axis of rotation and simultaneously moved in a planetary path about the primary axis of rotation. Each plant bed is formed by an apertured outer cylinder, a perforated inner cylinder positioned coaxially therewith, and rooting media disposed in the space therebetween. A rotatable manifold distributes liquid nutrients and water to the rooting media through the perforations in the inner cylinders as the plant beds are continuously rotated by suitable drive means.

16 Claims, 8 Drawing Figures

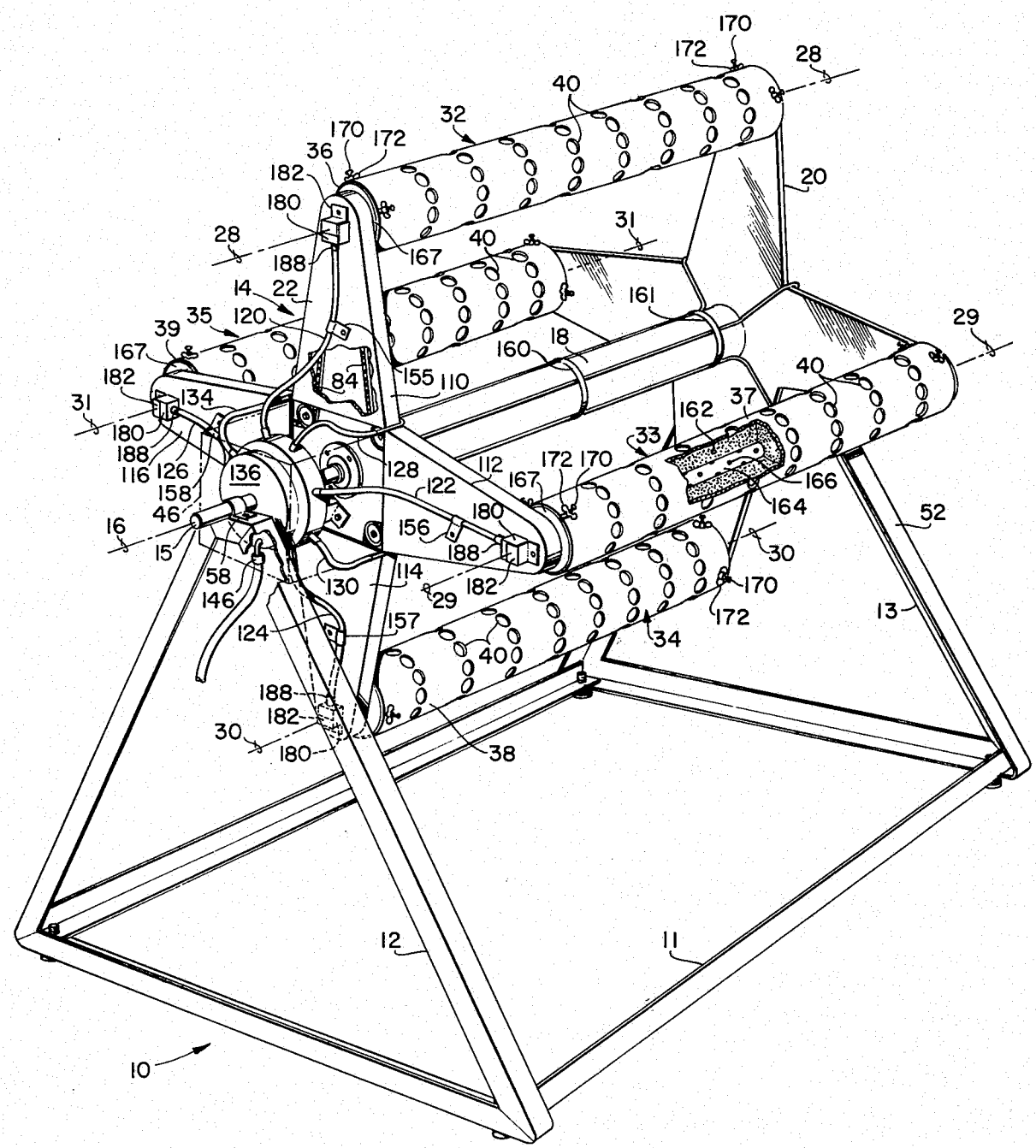
FIG_1

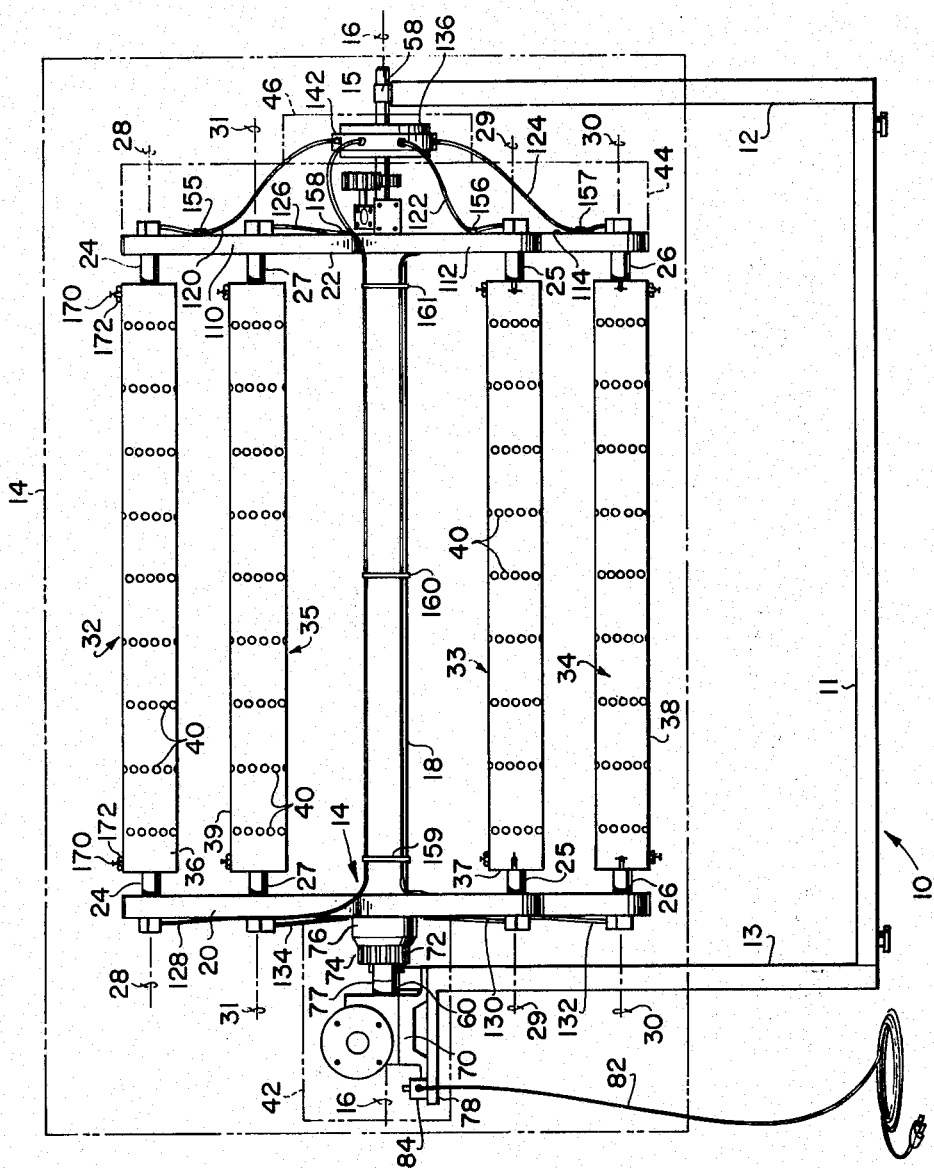

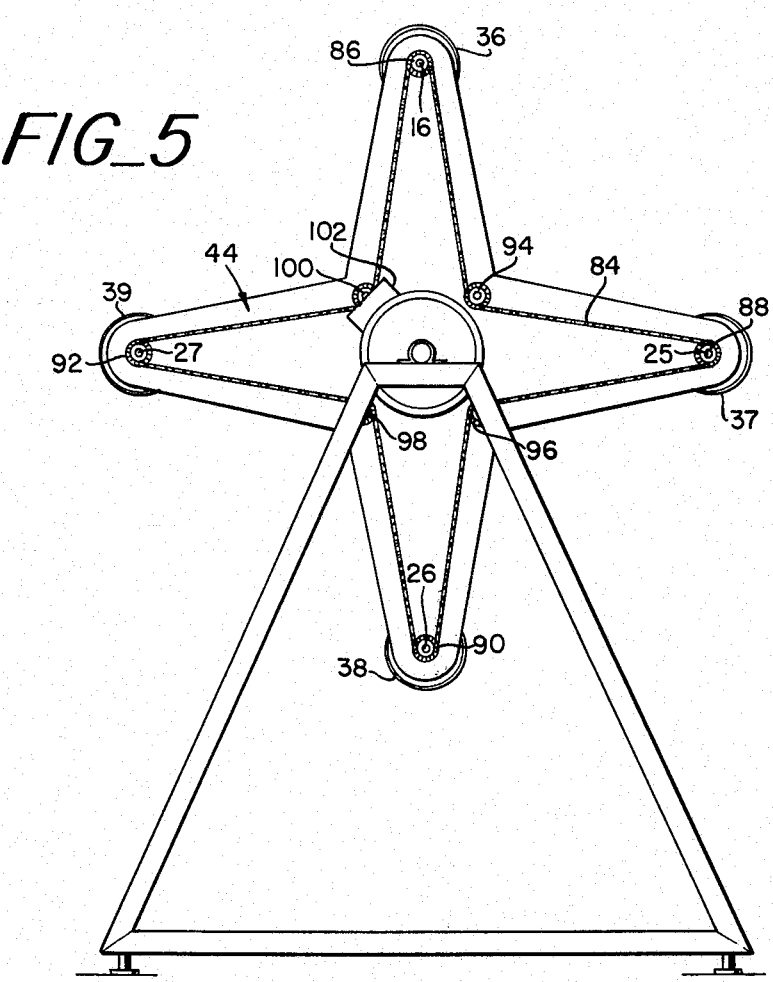
FIG_5
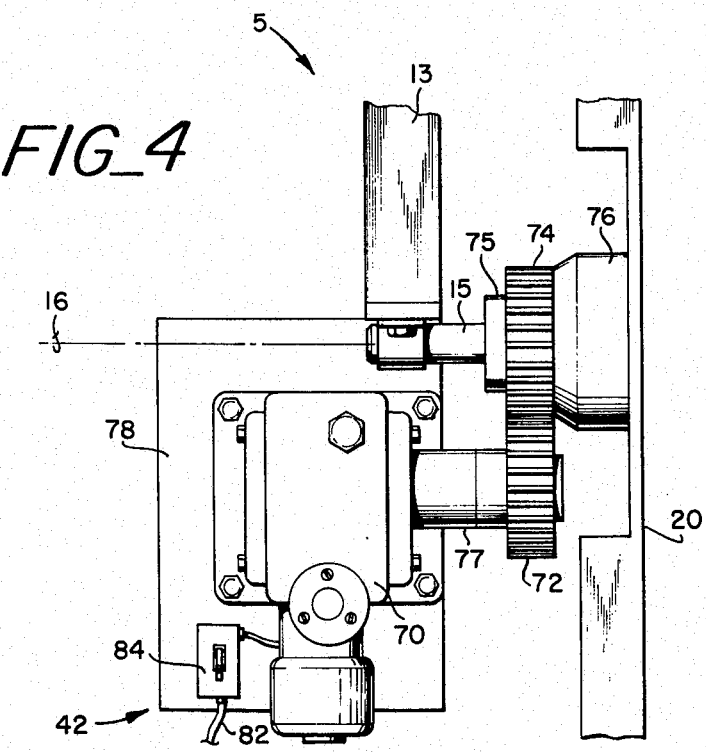
FIG_4

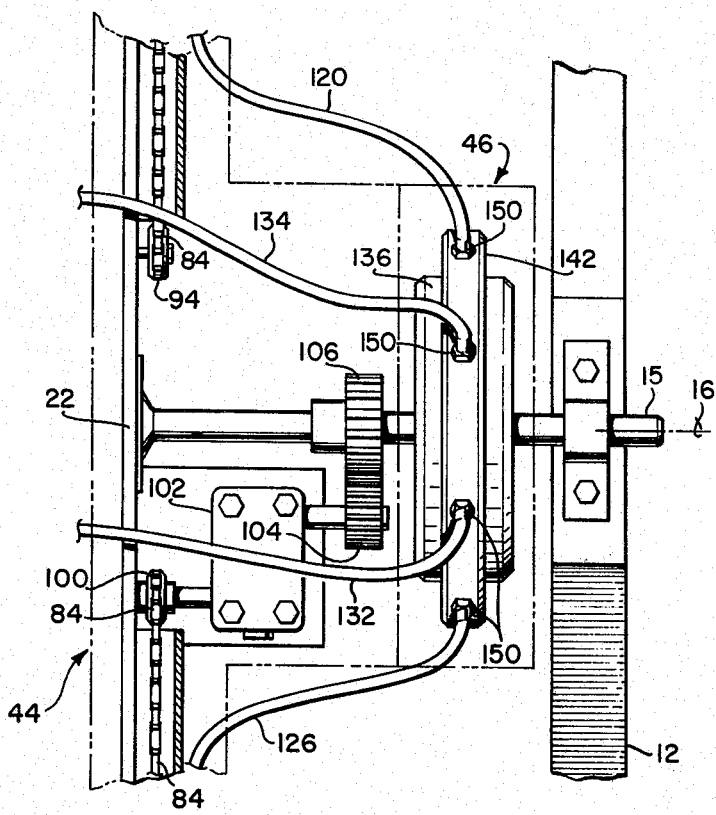
FIG_6
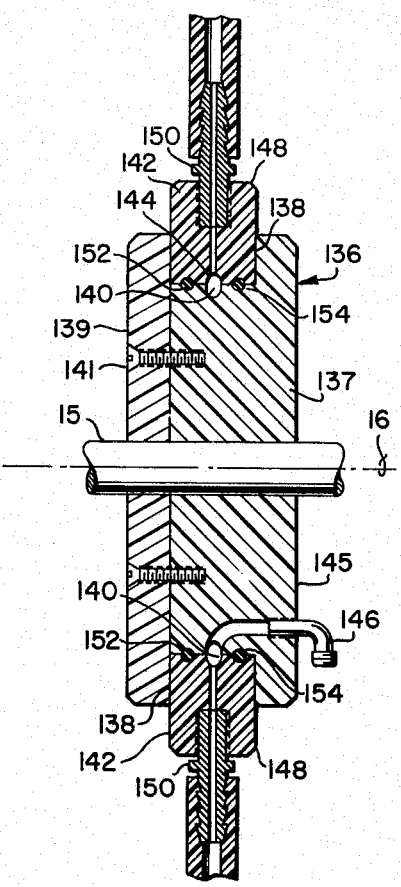
FIG_7
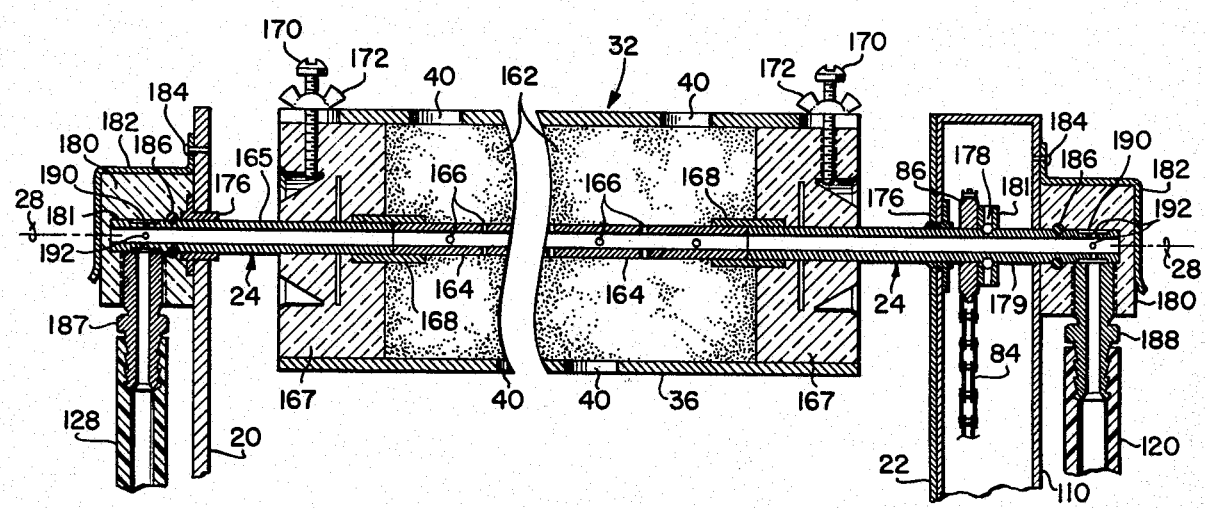
FIG_8

ROTARY PLANT GROWTH ACCELERATING APPARATUS

The invention described herein was made by an employee of the United States Government and may be used by or for the government for government purposes without the payment of any royalties thereon or therefor.

BACKGROUND OF THE INVENTION

1. Field of the Invention

The present invention relates generally to plant growth accelerating apparatus, and more particularly to rotary plant growth and acceleration apparatus wherein plants are grown in rotating beds driven in a planetary path about a primary axis so as to reduce the constraints of gravity upon the plants.

2. Discussion of the Prior Art

It has long been recognized that effective elimination of the unilateral geotropic stimulus on plant growth can be accomplished if the growing plant is rotated about a horizontal axis with a constant angular velocity small enough to prevent centrifugal effects from eliciting curvature responses. Apparatus in which plants can be grown in plant beds that are continuously rotated about a horizontal axis to reduce gravitational restraints are often referred to as "clinostats". In such apparatus, rotation of the plant beds at appropriate rates reduces the displacement of intracellular protoplasmic particles induced by gravity and restricts the fall of the particles to a quasicircular path of small radius such that the position of the particles remains virtually stationary with respect to the cell walls, membranes and other cytoplasmic constituents.

For the most part, the previous use of clinostats has been limited to research applications and their economic utility has not been recognized due to the lack of suitable apparatus capable of simultaneously providing the benefits of increased plant growth and increase in plant yield per unit of environmental space. Furthermore, even though single horizontal axis devices have long been employed in experimental work in attempts to nullify gravitational effects on plant growth, they are not functionally effective in sustaining the beneficial condition of gravity nullification over the long periods of time necessary for commercial plant production or for larger plants even over short periods of time. This inadequacy derives from the equivalence of the unidirectional centrifugal force generated by rotational nullification of gravity force, coupled with the sensitivity of plants to unidirectional force regardless of origin. Centrifugal force $F'$ in gravity equivalents may be expressed as $$F' = 1.118244 \times 10^{-5} W_1{}^2 L$$

where $W_1$ is the rotational rate of the horizontal axis in revolutions per minute, and $L$ is the distance of displacement of the plant or plant part from the axis of rotation in centimeters.

Attempts to avoid large displacements from the axis of rotation have heretofore precluded growing large plants on single axis devices or using cylindrical rooting media to grow the plants facing outwardly. The increase in centrifugal force as a function of the square of rotation rate has further precluded the use of rotation rates sufficiently great to effect gravity nullification.

Gravity nullification is accomplished by the movement of a plant in such a manner that the intracellular protoplasmic particles which are normally displaced by gravity (or equivalent forces) in the cytoplasmic fluid are not materially altered in location with respect to the cell walls, membranes, or other cytoplasmic constituents. Rotation of plants around a horizontal axis places intracellular particles in quasicircular trajectories. If rotation rates are sufficiently fast, the radius of the trajectory becomes so small that the particles remain virtually stationary in the cytoplasm with respect to displacement induced by gravity.

Both respiration and photosynthesis, the two major activities of plants, involve reactions between cytoplasmic particles of such great mass that they are displaced or contained in the protoplasm by gravity and those of such low mass that they are distributed by thermal energy (diffusion).

The expected and documented consequence of uniform distribution of the reactants of greater mass throughout the cytoplasm are increases in rates of photosynthesis, respiration, net carbon fixation and growth. This increase can be directly ascribed to the elimination of reaction created, rate limiting intracellular concentration gradients due to the more uniform distribution of reactants throughout the cytoplasm.

Benefits of removing plants from the growth constraint of gravity however, cannot be economically realized on any of the prior art machines because as mentioned above, most are rendered ineffective by the introduction of unidirectional centrifugal forces of too great a magnitude for sustained use. The balance of the designs, in the hope of avoiding this centrifugal force limitation employ rotation rates which are far too slow. In such cases, the desired uniformity of particle distribution is not accomplished. Particles either roll around the cell periphery or fall through large areas of cytoplasm. In either event there may be disruption of the fine structure of the cytoplasm and consequently a loss of beneficial effects.

Arguments of economic utility of these research machines have suffered not only from the disregard for the physical basis of gravity stimulus and consequent loss of benefit, but also from the total disregard in the design of these machines for economy of space utilization.

The potential utility of prior art apparatus has also been limited due to the lack of suitable means for distributing plant nutrients and water to the plants while the device is in continuous operation. Since periodic retardations in rotation of even as little as a second or two cause plants to show geotropic curvature owing to the summation of these short stimuli, the inability to supply nutrients and water without interruption of motion has been a serious obstacle to the success of prior art devices.

Reference to the above mentioned prior art is made in a publication by R. R. Dedolph and M. H. Dipert entitled "The Physical Basis of Gravity Stimulus Nullification by Clinostat Rotation"; *Plant Physiology* (1971), pp. 756–764. The U.S. Pat. No. 3,380,190 to Granger may also be of possible interest in that it relates to apparatus for demonstrating the influence of gravity on plant life.

SUMMARY OF THE PRESENT INVENTION

It is therefore a principal objective of the present invention to provide an improved rotary plant growth accelerating apparatus for increasing plant yields by nullifying the constraints of gravity on plant growth and simultaneously increasing the yield per unit volume of space.

Another objective of the present invention is to provide an improved rotary plant growth accelerating apparatus in which liquid plant nutrients and water may be distributed to a number of plant beds while they are being rotated about both planetary and primary axes.

Briefly, a presently preferred embodiment of the present invention includes a horizontally disclosed primary drive shaft rotatable about its axis, a plurality of arms projecting radially from the drive shaft, a plurality of rotatable, cylindrical plant beds supported by the arms, and a rotatable manifold for supplying liquid plant nutrients and water to the plant beds. The plant beds are spaced at equal distances and radial angles relative to one another about the primary drive shaft and are simultaneously rotated about their own axes and moved over a planetary path around the axis of the primary shaft. The plant beds are formed of outer cylinders which are apertured to permit the plants to extend therethrough and grow about the exterior of the cylinders, and perforated inner cylinders supported within the outer cylinders to receive and distribute liquid nutrients and water to rooting material disposed between the inner and outer cylinders.

A principal advantage of the present invention is that due to the dual axis rotation of the plant beds, gravitational constraints on the growing plants are effectively nullified thereby causing a substantial increase in growth rate.

Another advantage of the present invention is that liquid nutrients and water may be distributed to each plant bed without interrupting or otherwise effecting their rotation about the planetary and primary axes.

Still another advantage of the present invention is that nutrients and water may be introduced at each end of the plant beds so as to insure equal distribution to the several plants in a particular bed.

These and other objects and advantages of the present invention will no doubt become apparent to those of ordinary skill in the art after having read the following detailed description of the preferred embodiment which is illustrated in the several figures of the drawings.

In the drawings

FIG. 1 is a perspective view of a rotary plant growth accelerating apparatus in accordance with the present invention;

FIG. 2 is an end view of the apparatus shown in FIG. 1;

FIG. 3 is a side elevational view of the apparatus shown in FIG. 1;

FIG. 4 is an enlarged view of the main drive assembly of the apparatus shown in FIG. 1;

FIG. 5 is a diagrammatic view illustrating the planetary drive assembly of the apparatus shown in FIG. 1;

FIG. 6 is an enlarged side view of the distribution manifold of the apparatus shown in FIG. 1;

FIG. 7 is a cross-sectional view of the distribution manifold shown in FIG. 6; and FIG. 8 is a broken cross-sectional view of one of the plant beds shown in FIG. 1.

DETAILED DESCRIPTION OF THE PREFERRED EMBODIMENT

The above mentioned problems of centrifugal force and economy of space utilization may be concomitantly resolved in accordance with the present invention by using an apparatus such as that shown in FIG. 1 of the drawing. Generally speaking, this apparatus is comprised of a dual axis system caused to rotate at $W_1$ rpm about a horizontal primary axis. The system includes four planetary subsystems caused to rotate at $W_2$ rpm about four horizontal planetary axes. Each of the four planetary axes are centers of plant growing cylinders, referred to as "plant beds", with spacing configuration on the cylinder as will be described below.

Theoretically speaking, the trajectory of a particle in such a system is that of a quasi-circular path derived from rotation around the primary axis. The "center" of the quasicircular path in turn moves on a cardioid-like path deriving its length from the magnitude of the centrifugal force generated by primary axis rotation, and its shape from the varying magnitude of this force due to a changing distance of displacement of the particle from the primary axis which results from rotation of the particle around the planetary axis. The cardioid-like path undergoes a linear displacement due to centrifugal force generated by rotation around the planetary axis.

Appropriate rates of rotation for the primary and planetary axes are those rates which minimize the area of the combined trajectory. These values ($W_1$ and $W_2$) may be determined by minimizing the total area $A_t$ traversed by the described trajectory where $$A_t = \left[ gr^2 \frac{\rho_s - \rho_f}{n} \right]^2 \left[ \left( 4.51 \times 10^{-9} R^2 \frac{W_1^4}{W_2^2} \right) \right.$$
$$+ \left( 5.05 \times 10^{-3} R_2 \frac{W_1}{W_2} \right) + \left( \frac{14.147}{W_1} \right)$$
$$+ (2.129 \times 10^{-5} R_2^2 W_1^2 W_2 T)$$
$$\left. + \left( 1.016 R_2 \frac{W_2^2}{W_1} T \right) \right]$$

where
  $g$ is the acceleration of gravity,
  $r$ is the radius of the cytoplasmic particle in question,
  $\rho_s$ is the density of the particle,
  $\rho_f$ is the density of the cytoplasmic fluid,
  $n$ is the viscosity of the cytoplasmic fluid,
  $R_1$ is the radius of rotation of the primary axis,
  $R_2$ is the radius of rotation of the secondary axis,
  $W_1$ is the rate of rotation of the primary axis,
  $W_2$ is the rate of rotation of the secondary axis, and
  $T$ is the growth period in days.

Using this formula, it can be shown by recursive methods that a starch particle in the cytoplasm of a lettuce cell and having $r = 1$ micron where $\rho_s = 1.5$, $\rho_f = 1.0$ and $n = 0.05$, and where the particle is displaced 30 centimeters from the secondary axis and grown for 30 days, it will have a minimum area of displacement of 1-2.217 microns$^2$ when $W_1 = 3.30$; and $W_2 = 0.095$. For the five axes system, this will constitute a maximum displacement of a particle in a cell during a 30 day growing period.

The choice of four planetary axes moving around a primary axis was derived from a consideration of the maximum surface area for plant growth which might be obtained in a rotational volume of radius $R_1 + R_2$ by using various numbers of planetary cylinders.

Referring now to FIG. 1 of the drawing, a perspective view of a presently preferred embodiment of a rotary plant growth accelerating apparatus in accordance with the present invention is illustrated and designated generally by the reference character 10. Broadly speaking, the principle functions of the apparatus are to (1) accelerate a given plant's growth by rotating the plant in the above described manner so as to nullify the geotropic stimulus normally applied to the plant by gravity and (2) to increase the plant yield per unit of space.

Apparatus 10 includes a stationary mounting stand assembly comprised of two laterally spaced A-shaped support members 12 and 13 for supporting the rotatable plant bed system or assembly 14 in an elevated position. More particularly, the assembly 14 is carried by a fixed shaft 15 that is supported at its opposite ends by the elevated apexes of the members 12 and 13. Shaft 15 establishes a primary axis 16 about which assembly 14 revolves. Assembly 14 includes a primary drive shaft 18 which is disposed coaxial with shaft 15 and is rotatably supported thereby. A pair of star-shaped plant bed support members 20 and 22 are affixed to opposite ends of the primary drive shaft 18 and are rotatable in unison therewith about the primary axis 16. Each of the members 20 and 22 include four radially projecting arms which extend at 90° intervals about shaft 18, with each arm of one support member being aligned with the corresponding arm of the other support member.

Four cylindrical plant beds 32–35 are disposed between the distal ends of corresponding pairs of the arms and are rotatably affixed thereto by spindles 24, 25, 26 and 27, the centerlines of which establish planetary axes 28, 29, 30 and 31 for the respective plant beds. Each of the plant beds includes a hollow outer cylinder, numbered 36–39 respectively, which forms an outer confine for a supply of rooting media in which plants may be grown. A plurality of apertures 40 are provided in the side walls of each cylinder so that the plants may grow out of the rooting material and project radially outwardly from the cylinders center. The apertures 40 are preferably arranged in rings circumscribing each cylinder with the apertures of each ring being radially spaced at equal angles about the axis of the cylinder. The rings of apertures are equally spaced along the length of the cylinders, and corresponding apertures of adjacent rings are radially offset relative to each other such that the centers of corresponding apertures in alternating rings are aligned with the centers of separating spaces of the adjacent rings, as illustrated in FIG. 3.

A main drive assembly 42, shown in FIGS. 2, 3 and 4 is provided for driving the main drive shaft 18 and support members 20 and 22 about the primary axis 16, thereby causing the plant beds 32–35 to move in a planetary path about axis 16. A planetary drive sub-assembly 44, illustrated in FIGS. 5 and 6, simultaneously drives the plant beds 32–35 about their respective planetary axes 28–31. A rotating fluid supply manifold sub-assembly 46, as illustrated in FIGS. 1, 6 and 7, is disposed at one end of shaft 15 adjacent the support member 22 for distributing a supply of liquid nutrients and water to each of the plant beds 32–35.

Referring now specifically to FIGS. 2, 3 and 4, it will be noted that the main drive sub-assembly 42 includes an activated gear reduction motor 70 coupled to a driver gear 72 that is intermeshed with a driven gear 74 which is journaled to the shaft 15 by a bearing 75 and fixedly connected to shaft 18. A slip-clutch mechanism 77 is provided between the output shaft of motor 70 and the driver gear 72 to prevent overloading of the motor. Clutch mechanism 77 also provides a safety feature which prevents possible injury to anyone becoming enmeshed in the apparatus during its operation. The motor 70 is supported on a mounting bracket 78 that is affixed to the support member 13.

Electrical power for motor 70 is received through a power line 82 and is controlled by a line switch 84 that is mounted to the bracket 78. Energization of motor 70 causes gears 72 and 74 to drive shaft 18 and support members 20 and 22 about axis 16 thereby causing plant beds 32–35 to move in a planetary path about axis 16 at a rate established by the motor and drive train.

The planetary drive sub-assembly 44 is illustrated in detail in FIGS. 5 and 6 of the drawing wherein portions of the manifold sub-assembly 46 and the covers for the chain 84 are omitted for the sake of clarity. In defining a generally star-shaped loop, chain 84 engages four spindle driving sprockets 86, 88, 90 and 92 that are respectively coupled to spindles 24, 25, 26 and 27, three eccentric mounted idler sprockets 94, 96, and 98, and a chain driving sprocket 100. As shown in FIG. 6, sprocket 100 provides the output drive for a gear-reduction box 102 having an input gear 104 which meshes with and revolves in planetary fashion about a fixed sun gear 106 that is secured to the fixed shaft 15.

As support member 22 is driven about the primary axis 16 in the manner described above, gear box 102 is carried around the fixed shaft 15 so that planetary gear 104 rolls around the fixed sun gear 106 thereby supplying rotary input energy to gear box 102 which in turn suitably reduces the rotational speed of chain driving sprocket 100 relative to planetary gear 104. As sprocket 100 rotates, it drives chain 84, which in turn drives sprockets 86–92 causing plant beds 32–35 to be rotated about their respective axes of rotation. Proper tensioning of chain 84 is provided by position adjustmentof one or more of the eccentric mounted idler sprockets 94, 96 and 98. As shown in FIG. 1 of the drawing, the path of chain 84 is normally covered by means of coverplates 110, 112, 114 and 116 that are affixed to the arms of support members 20 and 22.

Liquid nutrients and water are delivered to plant beds 32–35 by means of the manifold sub-assembly 46 shown in detail in FIGS. 6 and 7. As illustrated in FIG. 7, head member 136 is comprised of a two-piece, generally spool-shaped cylindrical assembly including mating members 137 and 139 which are affixed together by means of suitable fasteners 141. The outer periphery of head member 136 is provided with an annular slot 138 which forms a track for receiving a rotating manifold 142. An annular groove 144 is provided in either the exterior annular surface of member 136 or in the interior annular surface of manifold 142, or in both as illustrated, so as to provide a fluid passageway 140 circumscribing the assembly. A pair of O-ring seals 152 and 154 are positioned on opposite sides of passageway 140 for providing fluid seals between the mating surfaces of manifold 142 and member 136. An additional passageway 145 is formed in member 136 and extends from a junction with passageway 140 to the end surface of member 136 and terminates in a threaded tubular connection 146. This passageway provides a means by which fluids may be communicated into the manifold passageway 140.

Manifold 142 is provided with a plurality of radially extending fluid exit passageways 148 which intersect passageway 140 at one end and terminate at the opposite end in exit ports including hose fittings 150 which are threadably engaged to the outer periphery of manifold 142. As shown in FIGS. 1 and 3, one end of each plant bed is connected to the manifold assembly by one of a first set of hoses 120, 122, 124 and 126, and the other end of each plant fitted is connected to the manifold assembly by one of a second set of hoses 128, 130, 132 and 134. Each one of the second set of hoses extends along the main drive shaft 18 and then up on arm of the support member where it is ultimately connected to the plant bed. As illustrated in FIG. 3, hoses 120–124 are clamped to support member 22 by means of clamps 155–157 respectively, and hoses 128–132 are clamped to the shaft 18 along its length by suitable clamps 159–161.

Water and liquid plant nutrients are introduced to the apparatus through the inlet 146 and into the distribution channel 140 formed by the groove 144 where it is thereby distributed to and thence through exit passageways 148 to the eight hoses connecting the rotating manifold 142 to opposite ends of the plant beds 32–34. Rotary motion is imparted to the manifold member 142 by the distribution hoses 120–136 as they are drawn around the primary axis 16 by the end supports 20 and 22 and shaft 18. It should be noted that the fluid is distributed to each end of the plant beds to insure uniform distribution of fluid along their lengths.

Referring now to FIG. 8 of the drawing, the structure of the plant bed 32, which is typical of the other three beds, is shown in detail. As previously indicated, the bed is generally comprised of an outer cylinder 36 which is provided with spaced rings of apertures 40 that are large enough to permit a plant to grow through, but small enough to contain the rooting media 162 within, and an inner cylinder 164 which is perforated to have a plurality of openings 166 large enough to permit fluids to flow therethrough into the rooting media.

Outer cylinder 36 is held in position relative to inner cylinder 164 by means of the spindles 24. As illustrated, each spindle includes a hollow shaft 165 and a hub 167 which is secured to one end of the shaft and is affixed to cylinder 36 by means of a screw 170 and wing-nut 172 or other suitable fastening means. The hub carrying end of shaft 165 is coupled to inner cylinder 164 by means of a suitable coupling member 168. The other end of shaft 165 extends through and is journaled to end member 20 by means of a bearing 176.

A junction block 180 is affixed to the outer wall of member 20 by a clip 182 and fastening screw 184 and has a cylindrical chamber for receiving the end 181 of shaft 165. Block 180 is provided with an O-ring 186 for developing a seal between the block and shaft 165. Note that the end 181 of shaft 165 is provided with an annular passageway forming groove 190 and apertures 192. A fitting 187 extends into block 180 and terminates proximate the groove 190 so as to communicate fluid from the hose 128 into the interior of shaft 165 and thence into cylinder 164.

The drive spindle at the opposite end of bed 32 is similar to that previously described except that it also has a sprocket 86 and detent clutch 178 affixed to its shaft 179. Clutch 178 includes an annular housing having a radially oriented openings 181 extending therethrough which carry spring loaded balls that mesh with corresponding cavities formed in shaft 179. Sprocket 86 is affixed to the housing of clutch 178 and through the frictional engagement of the balls and cavities serves to turn shaft 179 so long as the resistance to turning does not exceed the clutching capability of clutch 178 in which case the balls roll out of the cavities and permit sprocket 86 to turn about shaft 179.

When chain 84 is driven in the manner previously described, it causes sprocket 86 to drive shaft 179 thereby causing spindle 24 to rotate plant bed 32 about the axis 28. In the meantime, fluids carried by the tubes 120 and 128 are conducted through the fittings 187 and 188, the holes 192, the hollow interior of shafts 165 and 179 and thence into cylinder 164 where it is dispersed to the rooting media through openings 166. Since fluid is applied to both ends of cylinder 164, the fluid pressure along the length thereof tends to be uniform and thus equal amounts of fluid are introduced to the rooting media over the length of the bed.

In operation, once the apparatus is assembled and seeds or seedlings are disposed in the rooting material 162 beneath the apertures 40, motor 70 may be energized by closing switch 84. Motor 70 causes gear 72 to rotate driving gear 74 which in turn causes shaft 18 and support members 20 and 22 to rotate about the fixed shaft 15. As members 20 and 22 rotate, they carry plant beds 32–35 in a circular path around the main axis 16. Member 22 also carries the planetary drive assembly 44 about shaft 15, and as gear 104 rolls around fixed gear 106 it causes chain 84 to be driver by sprocket 100. Movement of chain 84 in turn causes the several plant beds to be rotated about their own planetary axes as they simultaneously move in circular fashion about axis 16.

Water and fluid nutrients can be supplied to the beds on either a continuous or intermitent basis by merely coupling a suitable supply source to the inlet fitting 146. As the fluid flows into manifold 136, it is distributed to each end of the plant beds by the various tubes and thence into the inner cylinder 164 where it is uniformly distributed to the rooting compound through the openings 166.

In using the apparatus, plants appropriately located over the cylindrical surfaces and grown facing outwardly from the rotating cylinder will, with normal increases in height automatically increase their spacing both along and around the cylinder. Staggering the plants in alternate rows around the cylinder effectively results in an increased distance between centers of plants in adjacent rows as well as between plants in a row around the cylinder as they grow. This permits a closer initial spacing of the plants due to the natural increase in plant spacing with increased plant height. The best number $n$ of plants in a row on a cylinder may be determined from the tangent of one-half the row spacing angle (the angle of intersection of the central axis of adjacent plants in a row). The row spacing angle equals $360/n$ and the relationship of plant radius $r$ to height of maximum diameter $h$ is therefore $r/h = \tan 360/2n$.

Using a Bibb lettuce plant as an example, the radius of light inception at maturity equals 4.5 inches. This radius is attained 6 inches above the surface of a 4 inch diameter cylinder. Therefore, the height of maximum diameter equals 8 inches. From the previous equation, it may be shown that the best row spacing angle is 30°. The linear distance $S_r$ between centers of the plants in a row at the height of maximum diameter may be stated as $S_r = 2h\sin 180/n$ In this example, $S_r$ is 8 inches.

The distance between staggered plants in adjacent rows of the cylinder will similarly be $S_r$ because plants are to have equidistant spacing at this height. The spacing $R_s$ between rows around the cylinder may be determined from the relationship $R_s = 2h (\sin^2 180/n - \sin^2 180/2n)^{1/2}$ which is obtained by substituting the previous relationship for $S_r$ into the equation $S_r = [R_s^2 + (2h \sin 180/2n)^2]^{1/2}$ where $h$ is the cylinder radius.

In the above example, the indicated spacing $R_s$ between rows around the cylinder would be approximately 6.84 inches. The claim that spacing between plants increases with height can easily be verified. At the time of seed emergence, the linear distance between the plants in a row around the cylinder might for example be 2 inches. The distance between plants in adjacent rows is 6.92 inches (by substitution of $h = 2$ and $R_s = 6.84$ in the above equation). What occurs during growth in this system is a transmutation from the equivalent of a 2 × 6.84 inch spacing at inception of growth to an 8 × 8 inch equidistant spacing at time of harvest, such increased spacing resulting solely from increases in plant height accompanying normal growth.

Uniformity of rooting medium texture and porosity may be assured by polymerizing a soil mix to form an open-celled foam. If necessary, soil aeration may be accomplished by periodically forcing air through the sub-irrigation system. Seeds will germinate and grow very well in the illustrated plant beds provided they are neither planted too deeply nor with such orientation that initial growth will not result in their emergence where phototropic reactions will direct top growth through maturity. In the calculation of rooting media depth requirements, the diameter rather tha the radius of the media cylinder may be employed, because roots grow across and throughout the entire matrix.

Numerous advantages are obtained in accordance with the present invention relating to automation, mechanical details of system construction and operation, and methods of increasing light utilization. Though no definitive data is available on labor requirements for a commercial operation, great labor reduction is anticipated since the plant growing locations will be highly concentrated in terms of floor area required and the plants move to the workers, rather than vice versa during the picking operation. Growth on the cylinders is uniform because all plants have the same ambient temperature and light experience and pass equally through all vertical changes in the environment. With cylindrical culture, plant growth is far faster and the level of technology necessary more demanding than in bench or bed culture. The disadvantage of more demanding technology is offset by the adaptability of the system to automated cultural manipulation.

By way of specific example, a four cylinder system of the type described designed for leaf-lettuce production stands only 57 inches high. Such a system multiplies floor space area by a factor of 5.21. This means pragmatically that yields of lettuce per square foot of glasshouse or growth chamber space are increased 520% when the benefits of removal of the gravity force constraint and spacing arguments (cylinder v. planar bed) are not considered. In fact, yields will be increased to well over 700% based on experience on single axis machines. The power necessary to turn the balance load on this machine at the required rates is less than 100 watts if cylinders 4 – 8 ft. long are used.

It is contemplated that numerous additions, alterations and modifications of the present invention will become apparent to those skilled in the art after having read the foregoing description of a preferred embodiment. For example, increased incident light utilization may be accomplished by placing a curved reflecting mirror below the cylinders to minimize loss of light intensity when plants are facing downwardly. Moreover, other configurations for the plant beds and support structure could also be used. It is therefore to be understood that the above described embodiment is for purposes of illustration only and is in no way to be considered limiting. Accordingly, the appended claims are to be construed as covering all alterations and modifications as fall within the true spirit and scope of the invention.

What is claimed is:

1. Rotary plant growth accelerating apparatus, comprising:

a mounting stand including a pair of spaced apart support members;

an elongated drive shaft supported by said mounting stand and having opposite ends journaled to respective ones of said pair of support members, the longitudinal axis of said drive shaft defining a primary axis about which said shaft may be rotated;

at least one pair of arms respectively affixed to opposite ends of said drive shaft and extending radially away from said drive shaft, said arms being rotatable about said primary axis with said drive shaft;

plant bed means having opposite ends journaled to the distal ends of the respective ones of said arms, said plant bed means being rotatable about a planetary axis oriented in spaced apart parallel relationship with said primary axis;

drive means for causing said drive shaft and said arms to rotate about said primary axis and carry said plant bed means in a planetary path around said primary axis;

planetary drive means responsive to rotation of said drive shaft and operative to cause said plant bed means to rotate about said planetary axis as it is moved over said planetary path; and means for supplying liquids to said plant bed means while they are being moved around said primary axis and rotated about said planetary axis.

2. Rotary plant growth accelerating apparatus as recited in claim 1 wherein said plant bed means include an elongated outer cylinder and an elongated inner cylinder disposed coaxial with said outer cylinder, the space between said inner and outer cylinders containing a rooting media in which plant life may be propagated.

3. Rotary plant growth accelerating apparatus as recited in claim 2 wherein said inner cylinder is perforated and at least one end thereof is connected to said means for supplying liquids whereby liquids caused to flow into said inner cylinder are dispersed into said rooting media through the perforations.

4. Rotary plant growth accelerating apparatus as recited in claim 2 wherein said outer cylinder is provided with a plurality of apertures through which plants growing in said rooting media may extend as they grow out of said plant bed.

5. Rotary plant growth accelerating apparatus as recited in claim 4 wherein said apertures are arrayed in several rings around said outer cylinder and said rings are spaced along the length thereof, and wherein corresponding apertures in alternating rings are aligned along the length of said outer cylinder, and corresponding apertures in the other rings are aligned with each other but radially offset relative to the corresponding apertures in said alternating rings.

6. Rotary plant growth accelerating apparatus as recited in claim 1 wherein said planetary drive means includes a first sprocket driven by said drive shaft, a second sprocket affixed to one end of said plant bed means, and a drive chain coupling said first sprocket to said second sprocket whereby said plant beds are caused to rotate about said planetary axis as they are moved around said primary axis.

7. Rotary plant growth accelerating apparatus as recited in claim 1 wherein said means for supplying liquids to said plant bed means includes, a fixed cylindrical member disposed along said primary axis, said fixed member having an annular groove formed in its outer cylindrical surface and an entrance passageway communicating one end surface of said fixed member with said groove, an annular manifold member rotatably disposed about said fixed member in covering relationship to said groove and having at least one exit passageway communicating the inner annular surface thereof with the outer annular surface, means forming fluid-tight seals between said fixed member and said manifold member on each side of said groove, and conduit means coupling said exit passageway to said plant bed means whereby fluids introduced to said entrance passageway flow through said groove, said exit passageway and said conduit to said plant bed means.

8. Rotary plant growth accelerating apparatus as recited in claim 7 wherein said plant bed means includes an elongated outer cylinder, an elongated inner cylinder disposed coaxial with said outer cylinder, and rooting media contained within the space between said inner and outer cylinders, said inner cylinder being perforated and having at least one end connected to said conduit means whereby fluids carried by said conduit means are introduced into said inner cylinder and flow through said perforations into said rooting media.

9. Rotary plant growth accelerating apparatus as recited in claim 8 wherein said outer cylinder has a plurality of apertures provided therein through which plants growing in said rooting media may extend.

10. Rotary plant growth accelerating apparatus as recited in claim 7 wherein said plant bed means include an elongated outer cylinder, an elongated inner cylinder disposed coaxial with said outer cylinder and having perforations in the walls thereof, and rooting media disposed within the space between said inner and outer cylinders for propagating plant life.

11. Rotary plant growth accelerating apparatus as recited in claim 10 wherein said manifold member includes a plurality of exit passageways, one of which is connected to one end of said inner cylinder by a first conduit means and another end of which is connected to the opposite end of said inner cylinder by a second conduit means, whereby fluids may be introduced into both ends of said inner cylinder to flow through said perforations into said rooting media.

12. Rotary plant growth accelerating apparatus, comprising:
an elongated drive shaft having a longitudinal axis defining a primary axis about which said shaft may be rotated;
a mounting stand including a pair of spaced apart support members each of which is journaled to respective ends of said drive shaft;
four pairs of arms respectively affixed to opposite ends of said drive shaft and extending radially away from said drive shaft, said arms being rotatable about said primary axis with said drive shaft;
four plant bed means supported by said four pairs of arms, each of said plant bed means including an elongated outer cylinder, an elongated inner cylinder disposed coaxial with said outer cylinder, and rooting media disposed within the space between said inner and outer cylinders, said plant bed means being rotatable about individual planetary axes oriented in spaced apart parallel relationship with said primary axis;
drive means for causing said drive shaft and said arms to rotate about said primary axis and to carry said plant bed means in planetary paths around said primary axis; and
planetary drive means responsive to rotation of said drive shaft and operative to cause each of said plant bed means to rotate about its individual planetary axis as it is moved over its planetary path.

13. Rotary plant growth accelerating apparatus as recited in claim 12 and further comprising means for supplying liquids to said plant bed means while they are being moved around said primary axis and rotated about their individual planetary axes.

14. Rotary plant growth accelerating apparatus as recited in claim 13 wherein said means for supplying liquids includes a rotary manifold means having a plurality of outlet ports, each of which is coupled to one of said plant bed means by suitable conduit means.

15. Rotary plant growth accelerating apparatus as recited in claim 14 wherein said manifold means includes a fixed cylindrical member disposed along said primary axis and having an entrance passageway communicating one end surface of said fixed member with the cylindrical surface thereof, an annular manifold member rotatably disposed about said fixed member and having an inner annular surface cooperating with said cylindrical surface to define an annular fluid passageway, said manifold member having at least four exit passageways communicating said annular fluid passageway and said outlet ports.

16. Rotary plant growth accelerating apparatus as recited in claim 12 wherein said planetary drive means includes a drive sprocket driven by said drive shaft, four driven sprockets each of which are coupled to one of said plant bed means, and a drive chain coupling said drive sprocket to said four driven sprockets, whereby said plant beds are caused to rotate about their individual planetary axes as they are moved around said primary axis.

* * * * *